US011497274B2

(12) United States Patent
Bentvelzen et al.

(10) Patent No.: US 11,497,274 B2
(45) Date of Patent: Nov. 15, 2022

(54) MODULAR FOOTWEAR AND METHOD OF MANUFACTURING

(71) Applicant: BOMA SHOE COMPANY, LLC, Edgewood, WA (US)

(72) Inventors: Joe Bentvelzen, Edgewood, WA (US); Joel Rusnak, Newburyport, MA (US)

( * ) Notice: Subject to any disclaimer, the term of this patent is extended or adjusted under 35 U.S.C. 154(b) by 0 days.

(21) Appl. No.: 16/410,662

(22) Filed: May 13, 2019

(65) Prior Publication Data

US 2020/0359743 A1    Nov. 19, 2020

(51) Int. Cl.

| | |
|---|---|
| *A43B 13/36* | (2006.01) |
| *G06Q 50/04* | (2012.01) |
| *G06Q 30/06* | (2012.01) |
| *G05B 19/418* | (2006.01) |
| *G06F 3/0482* | (2013.01) |

(52) U.S. Cl.
CPC ........ *A43B 13/36* (2013.01); *G05B 19/41805* (2013.01); *G06Q 30/0621* (2013.01); *G06Q 30/0643* (2013.01); *G06Q 50/04* (2013.01); *G05B 2219/45243* (2013.01); *G06F 3/0482* (2013.01)

(58) Field of Classification Search
CPC ................................ A43B 13/36; A43B 5/008
USPC .......................................................... 36/15
See application file for complete search history.

(56) References Cited

U.S. PATENT DOCUMENTS

| | | | |
|---|---|---|---|
| 5,317,822 A * | 6/1994 | Johnson | A43B 13/36 36/101 |
| 6,895,697 B2 | 5/2005 | Yang | |
| 7,698,834 B1 | 4/2010 | Courville | |
| 7,770,306 B2 | 8/2010 | Lyden | |
| 8,266,546 B2 | 9/2012 | Candrian et al. | |
| 9,032,644 B1 | 5/2015 | Koo et al. | |
| 10,032,202 B2 | 7/2018 | Cook et al. | |
| 10,074,124 B1 | 9/2018 | Evans | |
| 10,159,301 B2 | 12/2018 | Catlett | |
| 2005/0034332 A1* | 2/2005 | Moschel | A43B 3/108 36/101 |
| 2010/0024251 A1* | 2/2010 | Delgatty | A43B 13/36 36/101 |
| 2010/0050475 A1* | 3/2010 | Benz | A43C 15/16 36/114 |
| 2019/0223554 A1* | 7/2019 | Osborn | A43B 3/246 |

* cited by examiner

*Primary Examiner* — Timothy K Trieu
(74) *Attorney, Agent, or Firm* — Dean A. Craine, P.S.

(57) ABSTRACT

Modular footwear and a method of manufacturing that uses pre-manufactured outsoles each with a plurality of clips that fit into recessed clip openings formed on the top surface of the outsole. Disposed over the outsole is a mid-sole pad with clip openings configured to be aligned and registered over the clips located on the outsole. Disposed over the outsole is a shoe upper with a plurality of hook members configured to attached to the clips located on the outsole. Disposed inside the shoe upper is air upper sole pad that covers the mid-sole pad. Because different shoe uppers may be used with the same outsole, footwear retailers only need to carry a limited number of outsoles and a wide selection of shoe uppers to offer a wide variety of different styles on footwear. Customers can purchase different shoe uppers and exchange them on the outsoles to create different styles of footwear.

13 Claims, 17 Drawing Sheets

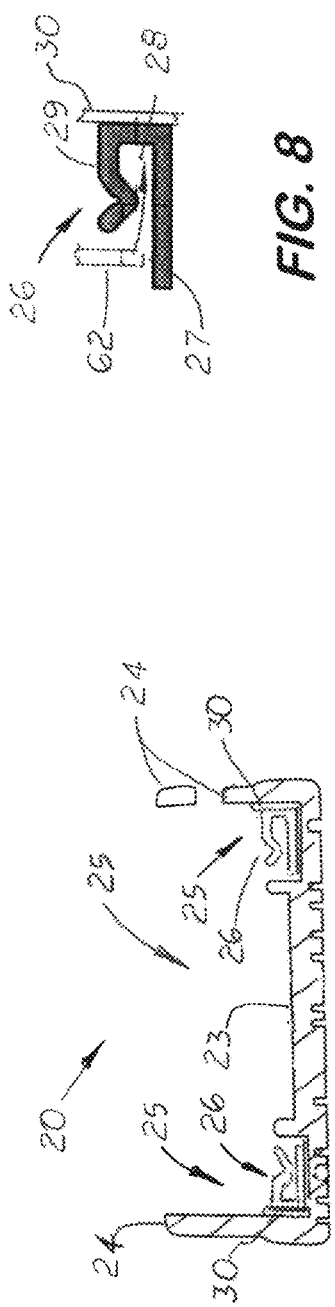
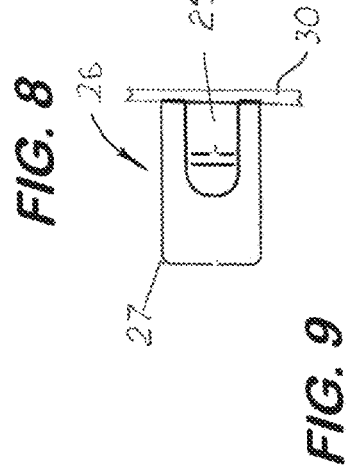
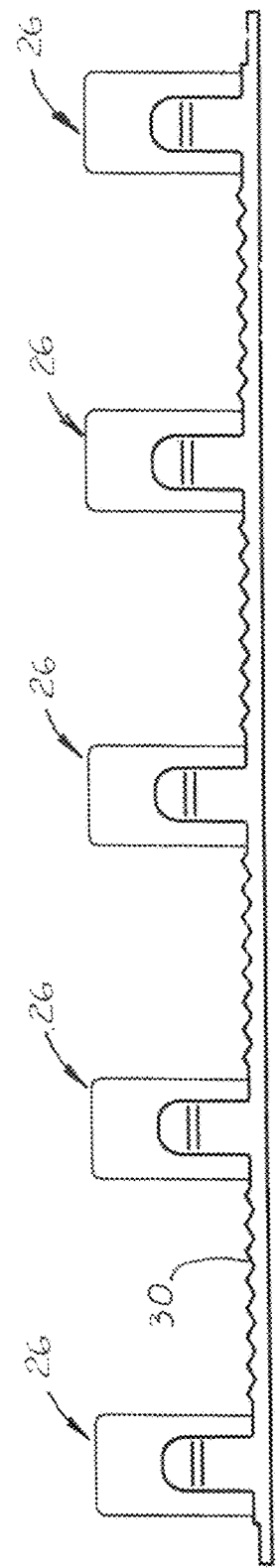
FIG. 6
FIG. 8
FIG. 9
FIG. 7

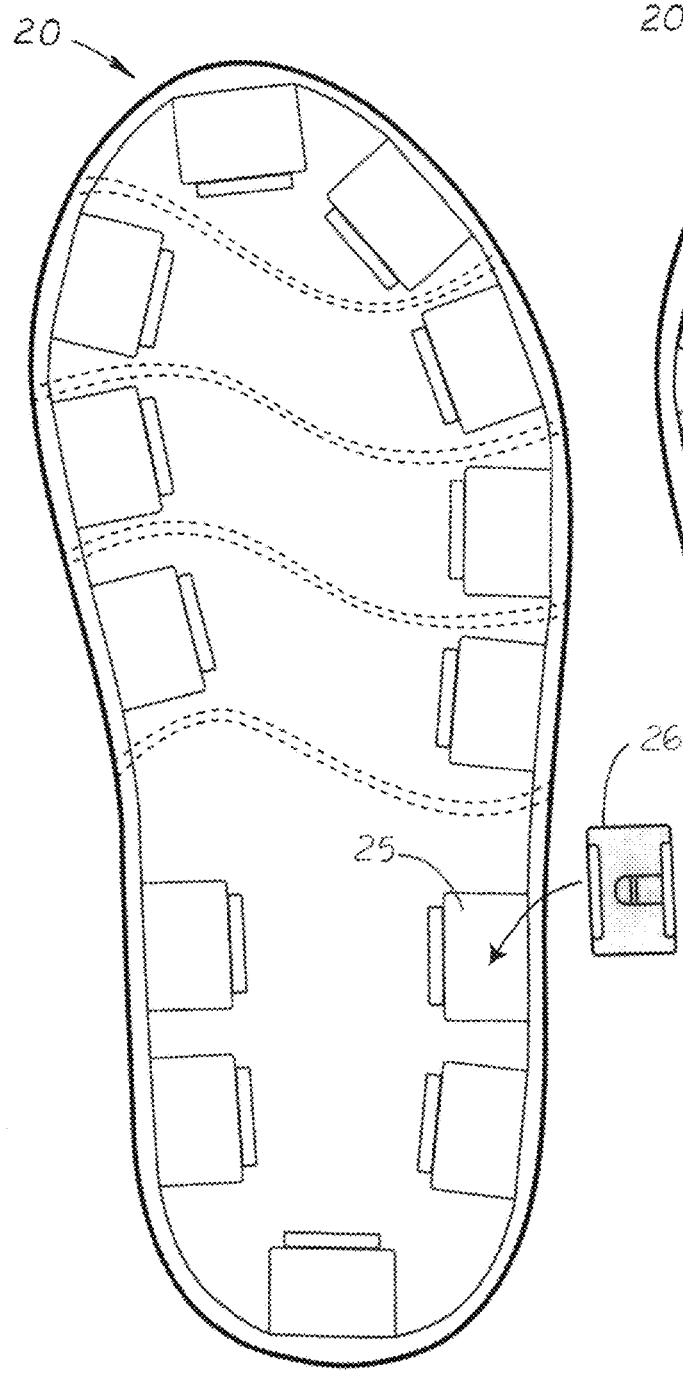
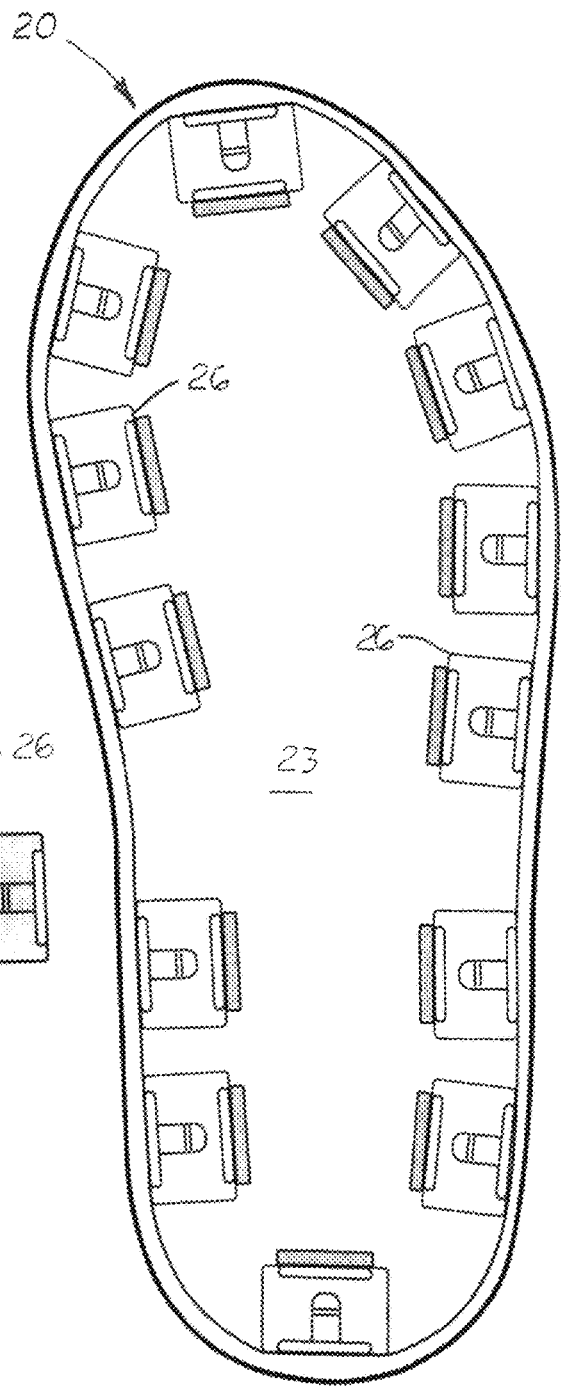
FIG. 10  FIG. 11

MODULAR FOOTWEAR AND METHOD OF MANUFACTURING

Notice is given that this patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to modular footwear made from exchangeable components, and more particularly to such footwear wherein the components are selected, manufactured, and assembled either onsite or in an assembly facility near a retail store.

2. Description of the Related Art

Today, footwear store operators must carry thousands of pairs of shoes in different styles and sizes. The number of shoes of a particular style usually follows a bell curve with the uncommon sizes on opposite ends of the bell curve and the most common sizes with the uncommon sizes on opposite ends of the bell curve and the most common sizes in the middle section of the bell curve. Footwear store operators usually carry large quantities of the most popular styles and in the most common sizes. They typically carry small quantities of shoes that are less popular styles or in uncommon sizes. Because most footwear store operators carry less shoe inventory in less common sizes, customers interested in less popular styles or less common foot sizes cannot find shoes at the footwear store.

Today, customers are purchasing their apparel and footwear for online retailers. As result, brick and mortar retail stores are looking into offering services similar to online retailers but also offer unique alternative services that online retailers cannot offer. With online footwear retailers, customers can visit online retailer's website and view a wide selection of different styles and sizes they offer. They can then select the shoes from the online footwear retailer's webpage and have them delivered in a few days. One drawback with purchasing shoes from an online footwear retailer, however, is that customers cannot inspect and try on the shoes before purchasing them. If the customer receives a pair of shoes from the online footwear retailer and later wants to return the shoes, the process for returning the shoes can be expensive and burdensome.

Today, footwear is usually manufactured in foreign countries with lower labor costs. After manufacturing, the footwear is placed in shoe boxes and loaded into large shipping containers and shipped to the U.S. The shipping containers are transported by truck or train to the nearest harbor and loaded onto a ship. The ship then delivers the shipping containers to a port in the U.S. The containers are then loaded onto trucks or train cars delivered to a regional warehouse operated by the footwear wholesaler. Local footwear retail store operators then order the footwear from the footwear wholesaler then delivered to the footwear retail store.

One drawback with the above described method of manufacturing, shipping and distributing footwear is that the footwear can spend several weeks or months in transit and in a regional warehouse which increase the overall cost of the footwear. Unfortunately, the footwear sold by brick and mortar footwear stores and online footwear sellers must cover these costs.

Another drawback with the above described method of manufacturing, shipping and distribution is that both brick and mortar and online footwear stores also pay for unsold footwear since they usually cannot return unsold footwear for credit to the footwear wholesaler or the footwear manufacturer. Accurately projecting the demand for a particular style of footwear falls on the footwear store owners.

Today, footwear that use a lightweight, polyurethane outsole, a foam midsole pad, and a seamless knitted shoe upper are very popular. The knitted shoe uppers are very comfortable and available in a wide range of different colors and designs. Unfortunately, knitted shoe uppers are less durable than leather shoe uppers.

Today, brick and mortar footwear stores are looking for alternative ways to compete with online footwear retailers. They are also looking for alternative methods of manufacturing, shipping and distributions footwear that can be used in both a retail store setting or an online retailer store setting that enables them to offer a wide selection of styles and colors of footwear to their customers, that also have lower manufacturing, shipping and distribution costs and lower unsold inventory costs.

SUMMARY OF THE INVENTION

These and other objects are met by the modular footwear retail system and a method of manufacturing and distributing footwear disclosed herein that uses modular footwear that includes pre-manufactured outsole configured to be used with different styles of shoe uppers each configured to be selectively attached to the outsole. Each outsole includes a plurality of clips mounted to its top surface. Disposed over the top surface of the outsole is a mid-sole pad with clip openings aligned and registered over the clips mounted on the outsole. In one embodiment, the mid-sole pad's clip openings are configured to expose only the clips on outsole the shoe upper. The clip openings protect the clips from being crushed when the upper sole pad is placed over it. In another embodiment, the outsole may include a recessed top surface in which the mid-sole pad may be placed. In another embodiment, the top surface of the outsole may include recessed clip receiving cavities formed or molded into the outsole. A single clip may be adhesively attached or integrally molded on the outsole.

The outsoles are available in different styles, sizes and colors and may be used with one or more styles of shoe uppers that are the same size. The shoe upper includes a lower perimeter edge configured to extend partially or entirely into the recessed top surface of the outsole and adjacent to the outsole's perimeter edge. Extending downward from the shoe upper's lower perimeter edge are a plurality of hook members. The hook members on the shoe upper are spaced apart along the lower perimeter edge so they can be selectively engaged to the clips on the outsole to securely hold the lower perimeter edge of the shoe upper against the outsole. In one embodiment, the hooks are attached to an upper ribbon affixed to the inside surface of the shoe upper.

In one embodiment, the shoe upper may be made of knitted material and the hook members are individually attached to the shoe upper.

Each hook member on the shoe upper must be attached to a clip on the outsole. Sometimes, the number of clips on the outsole may be greater than the number of hooks on the shoe upper leaving some clips on the outsole unused. Usually it is desirable to cover the unused clips on the outsole with a mid-sole pad. If the shoe upper is a replacement shoe upper configured to be used with the outsole, a replacement mid-sole pad may be distributed with the replacement shoe upper that is designed to cover the unused clips on the outsole.

In another embodiment, the shoe upper may include a rubber-like midsole that attaches to the lower edges of the shoe upper to create a water-resistant joint between the outsole and the shoe upper. The rubber-like midsole may be configured so the hook members when attached to the shoe upper extend below the rubber-like midsole. In an alternative embodiment, the hook members may be attached directly to the rubber-like midsole and extend downward therefrom.

The term 'modular' means that each footwear is made of components that are selective assembled to form the final footwear. One or more components used with each footwear is configured to be exchanged thereby enabling customers to create different styles or colors of footwear using shared components. For example, if a customer purchased footwear in one season that includes an outsole, a mid-sole pad, a shoe upper and an upper sole pad and later desires to change the footwear by attaching a replacement shoe upper to the original outsole, the customer would purchase a new shoe upper and replace the old shoe upper with the new shoe upper. Depending on the style of shoe upper purchased, a replacement mid-sole pad and an upper sole pad may be purchased and exchanged. If the customer wanted to use the old shoe upper and attach it to a new outsole, the customer may purchase the new outsole and replace the old outsole with the new outsole and attach the old shoe upper to the new outsole. If the new outsole has more clips than the old outsole, a replacement mid-sole pad and an upper sole pad may also be purchased.

For the footwear store operator, each footwear in each size is associated with images of different styles of footwear that can be made using one or more components used with the footwear being purchased. The ability to use some components from one style of color of footwear and combine them with components from another style or color footwear or buy the components separately, makes the modular footwear desirable for customers. Also, because a wide variety of footwear can be quickly assembled inside the footwear store by store personnel (or buy the customer) immediately after purchase, the motivation to buy footwear from an on-line footwear seller is reduced. Also, footwear store operators no longer need to carry in inventory a wide selection of finished footwear.

Also disclosed herein is a retail store footwear ordering and assembly system that helps the footwear store operators determine the compatible components that may be used with each footwear. The ordering and assembly system includes a server with a shoe assembly software program loaded into its working memory. The software assembly program is configured to keep track of the components needed to assemble each footwear for each size. The server is linked to an outsole database containing a plurality of outsole files each associated with a particular outsole for each size. Associated with each outsole file is a shoe upper database containing a plurality of shoe upper files each associated with a shoe upper. Associated with the outsole file and the shoe upper is a mid-sole pad file and an upper pad file. When a particular style, size and color of footwear is selected by a customer, the outsole file, the mid-sole pad file, the shoe upper file and the upper sole pad file are all identified.

Because each component that makes up the footwear is associated with a file that is cross-referenced with the other files, customers can easily determine which footwear style offers the greater number of replacement components. The replacement components can then be reviewed and later purchased and exchanged to create a wide variety of different footwear styles.

It should also he noted that because only replacement components are ordered and shipped to the customer, the overall shipping costs to the customer is less expensive than shipping an entire pair of footwear.

The server may also be coupled to a display located inside the footwear store or coupled to the INTERNET. Associated with each outsole file or shoe upper file is an optional image file showing images of the possible footwear styles for each size that can be assembled using the same outsole and different compatible shoe uppers. In the ordering and assembly system described above, the customer may be presented an image of the current and alternative footwears.

Also disclosed is a shoe upper manufacturing system that includes a server with a shoe upper manufacturing software program loaded into its memory that allows the footwear retail or online operator to make the shoe upper component on site. Connected to the server is a stitching machine, an ink printer and a leather cutting machine all coupled to the server. When a customer selects and purchases a style and size of footwear, the manufacturing software program identifies the style and size of the shoe upper to be manufactured that will be attached to an outsole. The manufacturing software program then sends instructions to the stitching machine instructing it to stitch the outline of the shoe upper in a stock piece of leather. After the stitch line has been created in the stock piece of leather, the stitched stock piece of leather is then delivered to the ink printer. The ink printer then prints a picture or graphic onto the stock piece of leather to a desired color. It should be understood that the picture or graphic may be supplied by the customer. After the stock piece of leather has dyed, the dyed stock piece is then delivered to a leather cutting machine that cuts the stock piece of leather along the outside edge of the sticking line to form the shoe upper.

After the shoe upper is formed, the hook members are then attached to the lower perimeter edge of the shoe upper. When completed, the shoe upper is then attached to the outsole and distributed to the customer or added to the shoe upper database and used to make the selected footwear.

The above shoe upper manufacturing system may also be used with knitted shoe uppers. The stitching machine and leather cutting machines are not used. Instead, an inventory of premanufactured, stock knitted shoe uppers in different styles and sizes are purchased by the store owner. Attached to the knitted shoe uppers are hook members.

The stock knitted shoe uppers have a base color, such as white that can be dyed by the ink printer. The manufacturing software program includes a menu page that lists the different colors and designs that can be printed on the knitted shoe upper.

DESCRIPTION OF THE DRAWINGS

FIG. 6 is a sectional end elevational view of the outsole taken along line 6-6 in FIG. 4.

FIG. 7 is a top plan view of a plurality of clips attached to a flexible substrate.

FIG. 8 is a side elevational view of a clip.

FIG. 9 is a top plan view of a clip.

FIG. 10 is a top plan view of an outsole with a clip openings formed thereon E configured to receive a clip.

FIG. 11 is a top a plan view of an outsole with a plurality of clips placed in clip openings formed on the top surface of the outsole.

DESCRIPTION OF THE PREFERRED EMBODIMENT(S)

Figure 1:
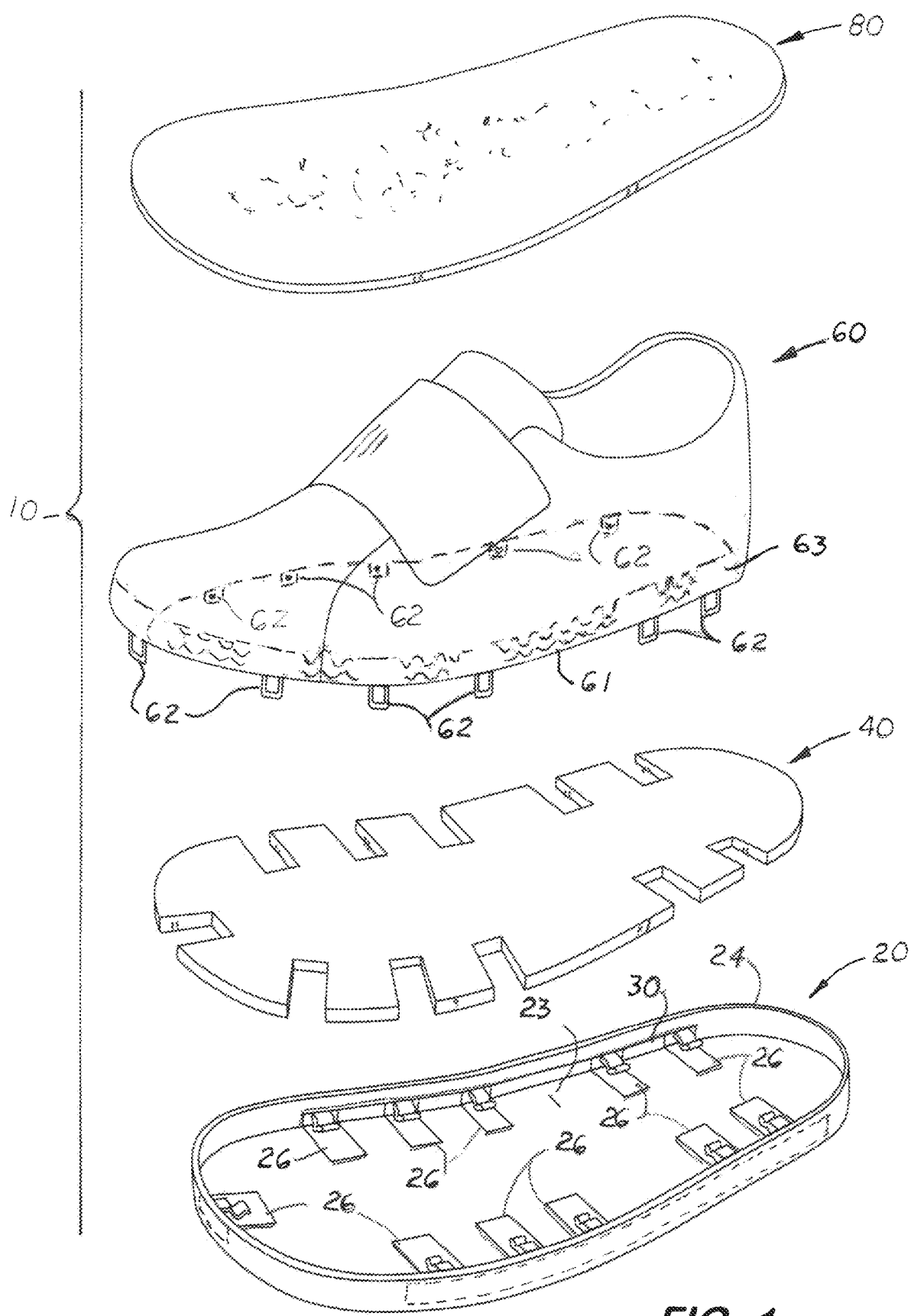
FIG. 1 is an exploded view of a modular footwear with an outsole with a plurality of clips located along its perimeter edges, a midsole with clip openings, a shoe upper with a plurality of hook members configured to connect to the clips on the outsole, and an upper sole pad configured to fit inside the shoe upper and over the mid-sole pad.
Figure 2:
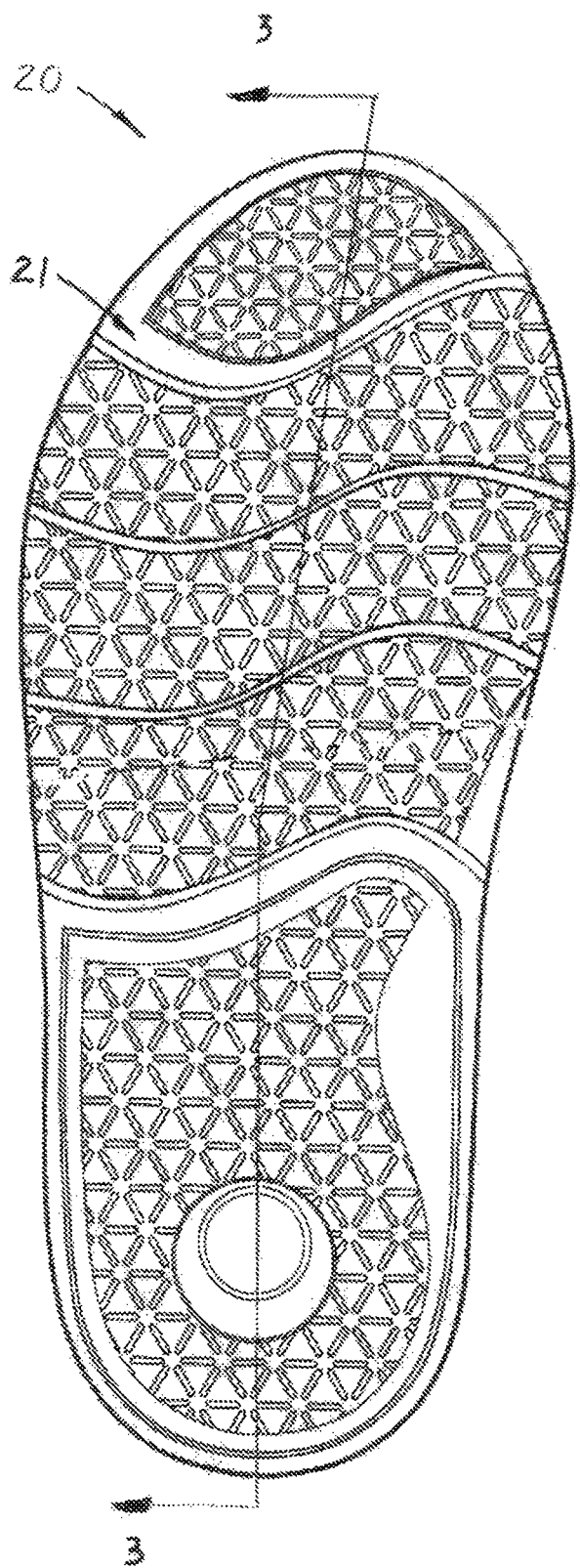
FIG. 2 is a bottom plan view of the outsole.
Figure 3:
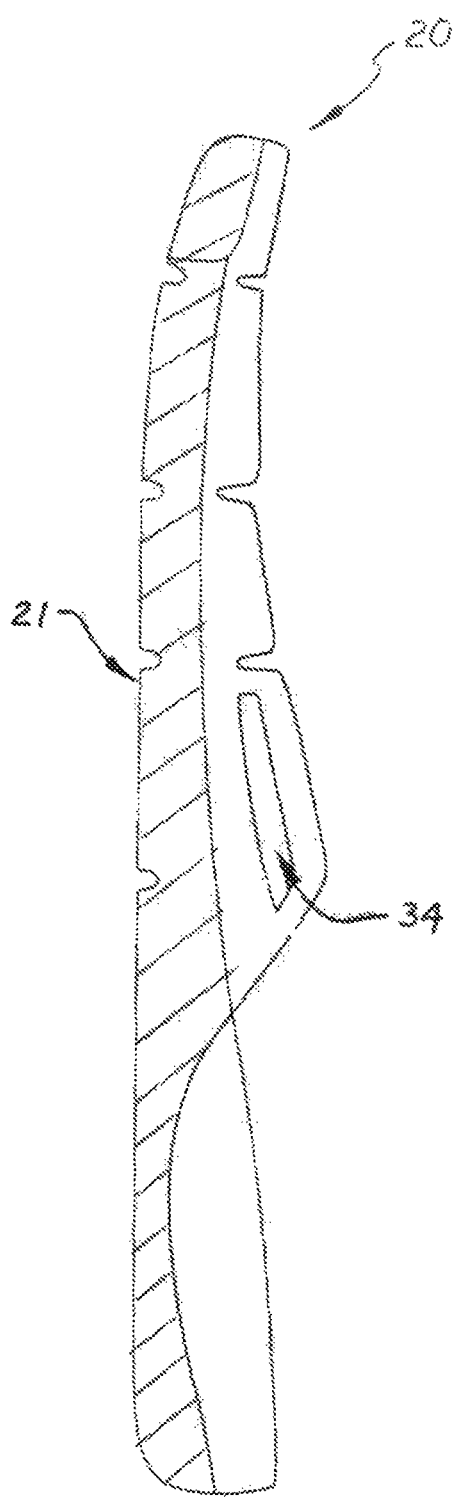
FIG. 3 is a side elevation view of the outsole.

Referring to FIG. 1, modular footwear 10 is shown with an outsole 20 with a plurality of clips 26 mounted along the outsole's perimeter edges 24, a midsole 40 with clip openings 42, a shoe upper 60 with a plurality of hook members 62 configured to connect to the clips 26 on the outsole 20, and an upper sole pad 80 configured to fit inside the shoe upper 60 and over the mid-sole pad 40. The modular footwear 10 enables the retail store or online store operator to offer a wide variety of different styles and sizes of footwear without having to carry an inventory of finished footwear.

Each footwear 10 comprises four components—an outsole 20, a mid-sole pad 40, a shoe upper 60 and an upper sole pad 80. Each component 20, 40, 60, and 80 may be exchanged to create a different style or color of footwear. When a customer purchases a footwear 10, it includes one outsole 20, one mid-sole pad 40, one shoe upper 60 and one upper sole pad 80. Later, if the customer wants to change the style of the footwear 10 by modifying the outsole 20 or the shoe upper 60, customer would purchase a replacement outsole 20' or replacement shoe upper 60' and replace the old outsole 20 or shoe upper 60. Accompanying the replacement outsole 20' or replacement shoe upper 60 may be a replacement mid-sole pad 60' and an upper sole pad 80'.

When a customer visits a footwear retail store or visits a footwear online website, the customer selects a style, size and color of footwear from the retail store's footwear catalogue or menu page. The manufacturing of the modular footwear takes less time. The finished footwear 10 can be shipped to the customer or held in the store for later pickup by the customer. Alternatively, the footwear retail store or online retailer can ship all of components need to assembly the footwear 10 to the customer who then assembles the footwear 10 himself or herself.

An important feature of the invention is use of clips 26 and hook members 62 on the outsoles 20 and shoe uppers 60, respectively, that enable them to be manually attached or detached. The locations of the clips 26 and hook members 62 on compatible outsoles 20 and shoe uppers 60, are at the same location so they may be aligned and interconnected. Because one outsole may be used with different styles and colors of shoe uppers 60, the footwear retail store can offer a wide variety of footwear 10 to each customer. In addition, the customer may buy additional shoe uppers 60 and exchanging them on the outsole 20.

The outsole 20, shown more clearly in FIGS. 1-6, is similar to standard outsole on a shoe configured to support a human foot. The outsole 20 includes a flat bottom surface 21 and a top surface 23. The perimeter edge 24 of the outsole 20 is raised thereby forming a recessed top surface 23. Attached or molded onto the top surface 23 are a plurality of clips 26 configured to selectively attached to hook members 62 attached to the lower perimeter edge 61 on the shoe upper 60. Formed on the medial and/or lateral sides of the outsole 20 is an optional strap opening, 34, respectively, as shown in FIG.

Figure 4:
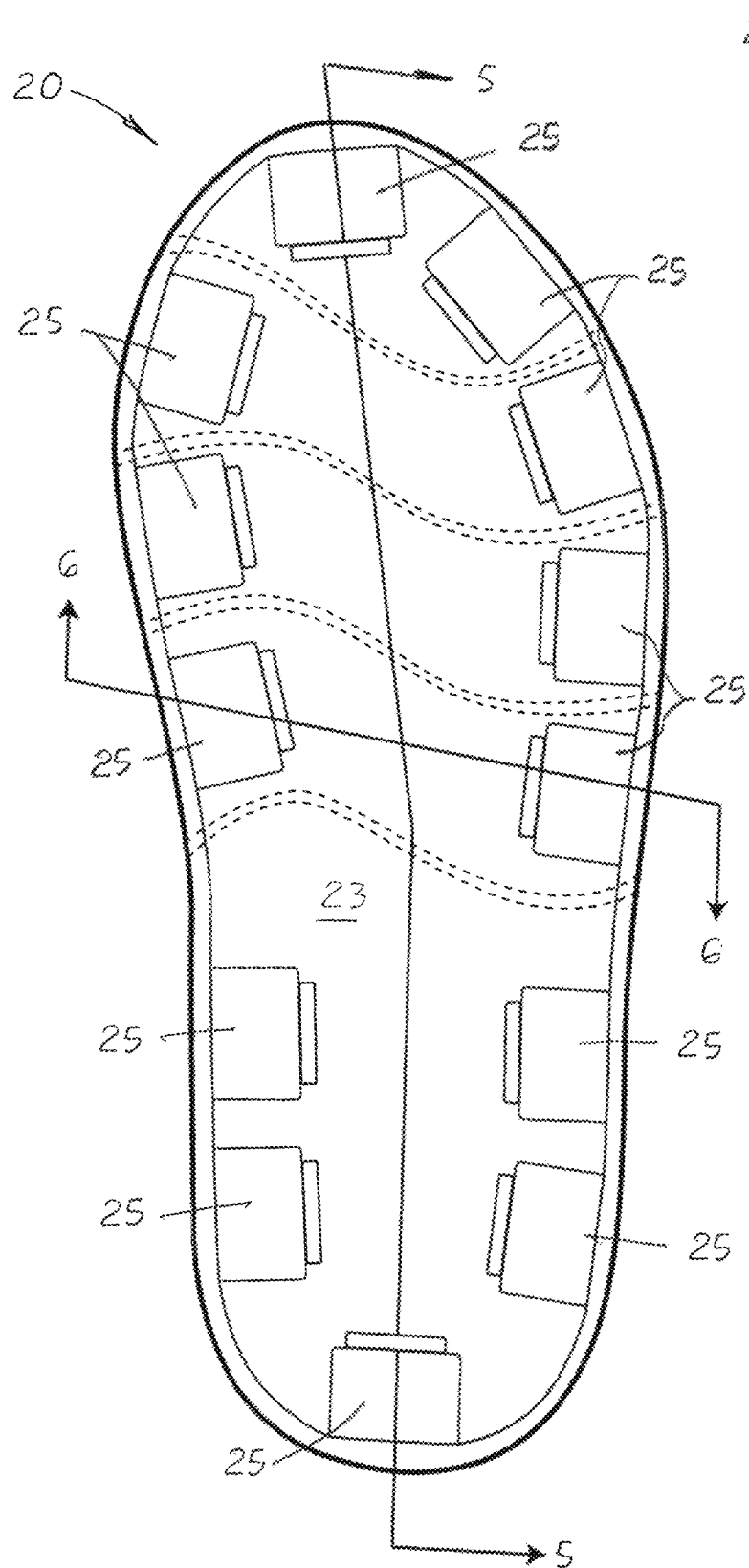
FIG. 4 is a top plan view of the outsole.
Figure 5:
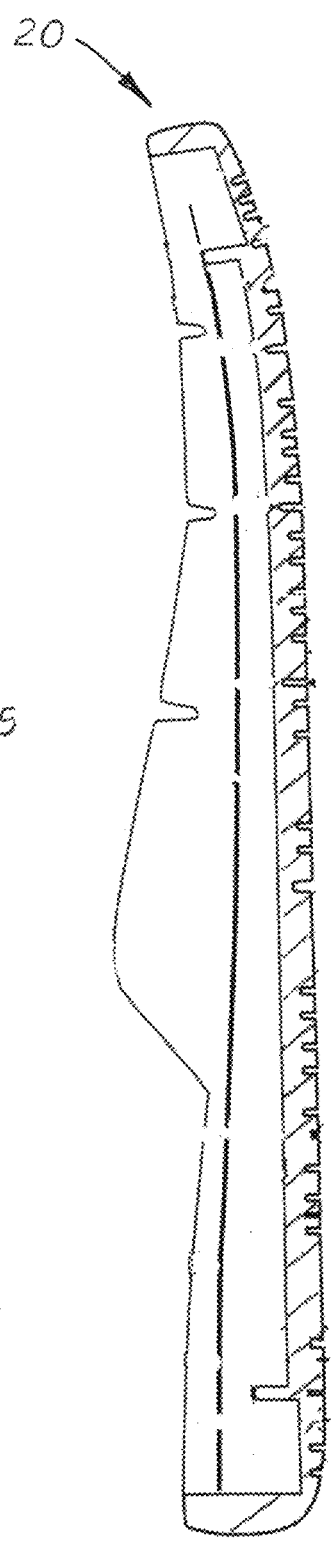
FIG. 5 is a sectional side elevational view of the outsole taken along line 5-5 in FIG. 4.

FIG. 4 is a top plan view of the outsole 20 showing a plurality of recessed clip openings 25 formed on the top surface 23 and adjacent to the raised perimeter edge 24. The number of clip openings 25 formed on the outsole 20 will vary depending on the style and size of the footwear. FIG. 6 is a sectional end elevational view of the outsole 20 taken along line 6-6 in FIG. 4 showing the end profile of the outsole 20 and the recessed clip openings 25.

The clips 26, shown more clearly in FIGS. 8 and 9, includes a rectangular-shaped, lower base 27 and an elevated, narrow upper tongue 29 that extends upward and over the lower base 27. The upper tongue 29 is made of flexible material and biased downward. The upper tongue 29 is closed at one end thereby forming a partially closed cavity 28 configured to receive a hook member 62 that extends downward from the shoe upper 60. During assembly, the hook members 62 are aligned and registered over the clips 26 and then is forced around the clips 26 to lock the hook members 62 in place on the clips 26. Each clip 26 measures approximately ½ inches in length and ⅓ inch in wide. The upper tongue 29 extends and approximately ⅛ inches above the base 27.

As shown in FIG. 7, a plurality of clips 26 may be attached or integrally formed to a thin attachment strip 30 that makes assembly of the outsole 20 easier. During manufacturing of the outsole 20, the attachment ribbon strip 30 is aligned along over the top surface 23 and adjacent to the perimeter edge 24. The clips 26 are aligned and configured to fit into the recessed cavities 25 formed on the outsole 20. FIGS. 10 and 11 are top plan views showing individual clips 26 being attached to the recessed cavities 25. The clips 26 may be individually attached to the recessed cavities 25 via an adhesive.

In one embodiment, the clips 26 may be attached to a plastic or nylon lower ribbon 30 with a plurality of clips 26 formed thereon. The clip 26 are perpendicularly to the inside surface of the lower ribbon 30 so that they extend inward and over the recessed openings 25 formed on the top surface of the outsole 20.

Figure 12:
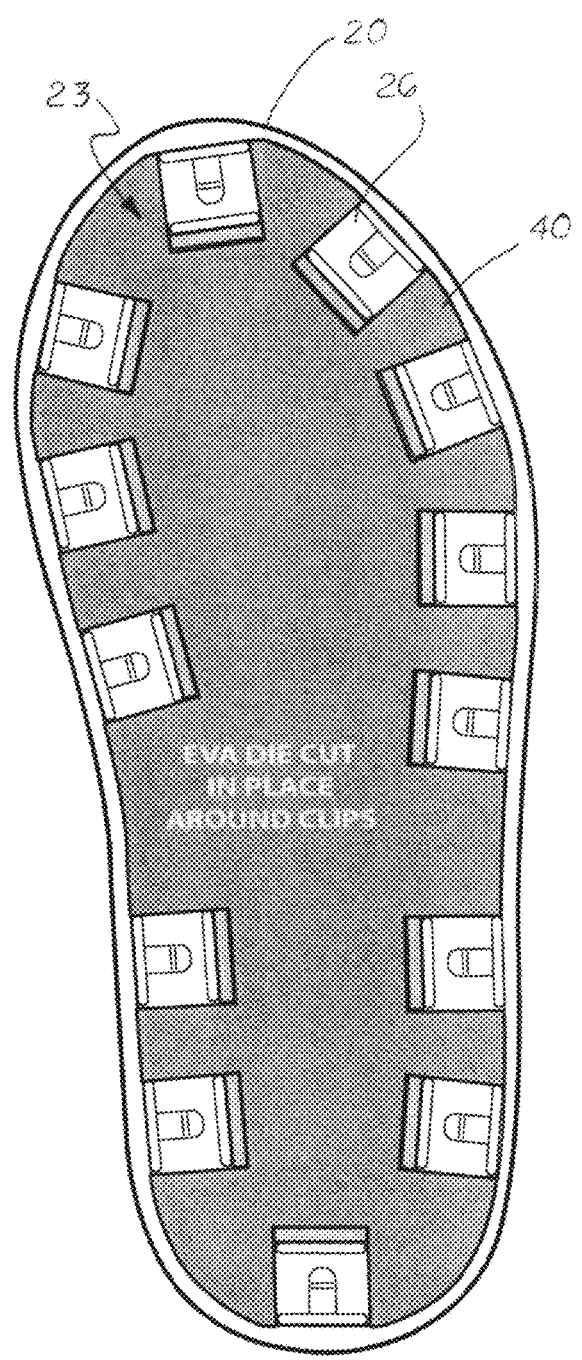
FIG. 12 is a top plan view of an outsole with clips and the mid-sole pad aligned and registered over the outsole.
Figure 13:
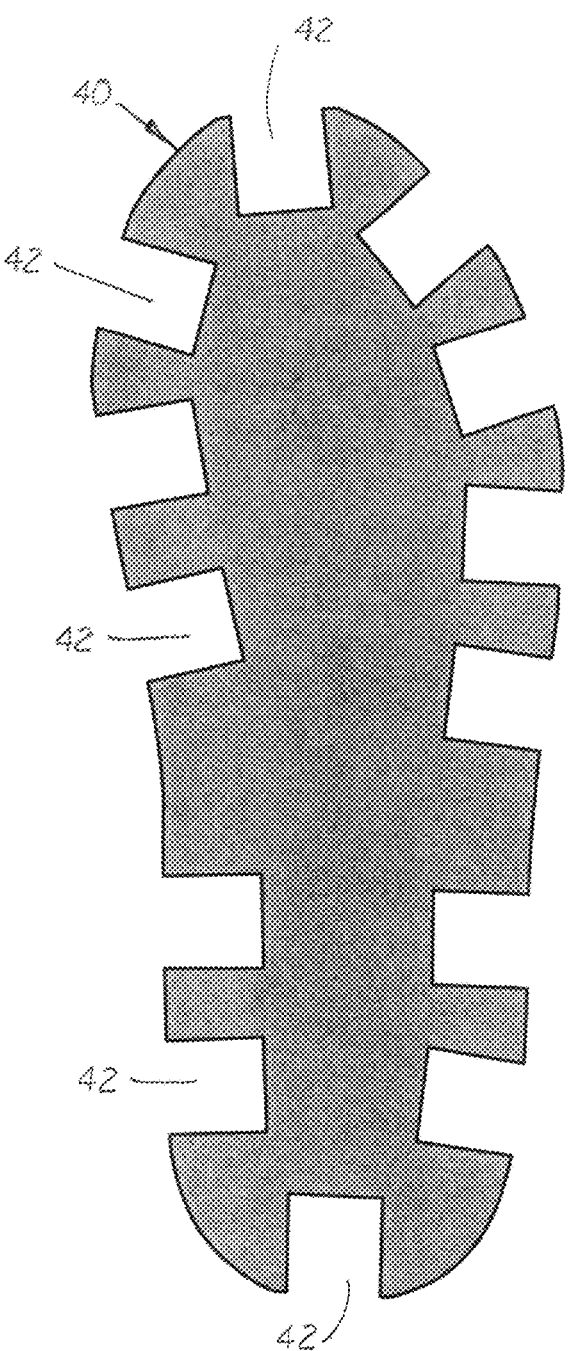
FIG. 13 is a top plan view of the mid-sole pad.
Figure 14:
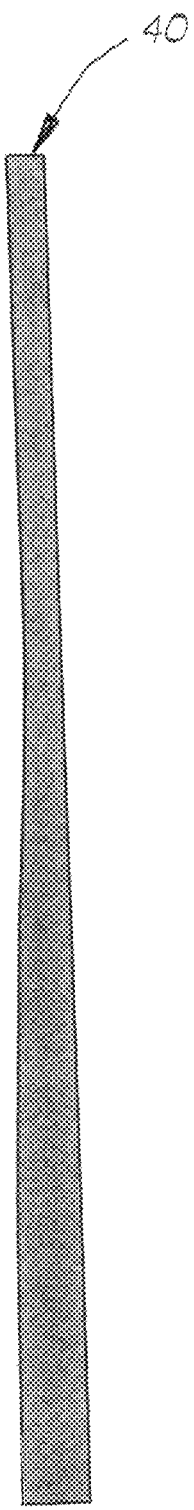
FIG. 14 is a side elevational view of a mid-sole pad.

FIG. 12 is a top plan view of an outsole 20 with the clips 26 and the mid-sole pad 40 aligned and registered over the outsole's recessed top surface 23. FIG. 13 is a top plan view of the mid-sole pad 40 configured to fit inside the recessed surface 23. The mid-sole pad 40 includes a plurality of clip openings 42 that are aligned and registered over the clips 26. FIG. 14 is a side elevational view of a mid-sole pad 40. The mid-sole pad 40 is thinner near the forefoot region of the foot and thicker near the heel region. In the embodiment shown herein, the mid-sole pad 40 is configured so that the lower perimeter edge of the shoe upper 60 fits inside the perimeter edge of the outsole 20.

Figure 15:
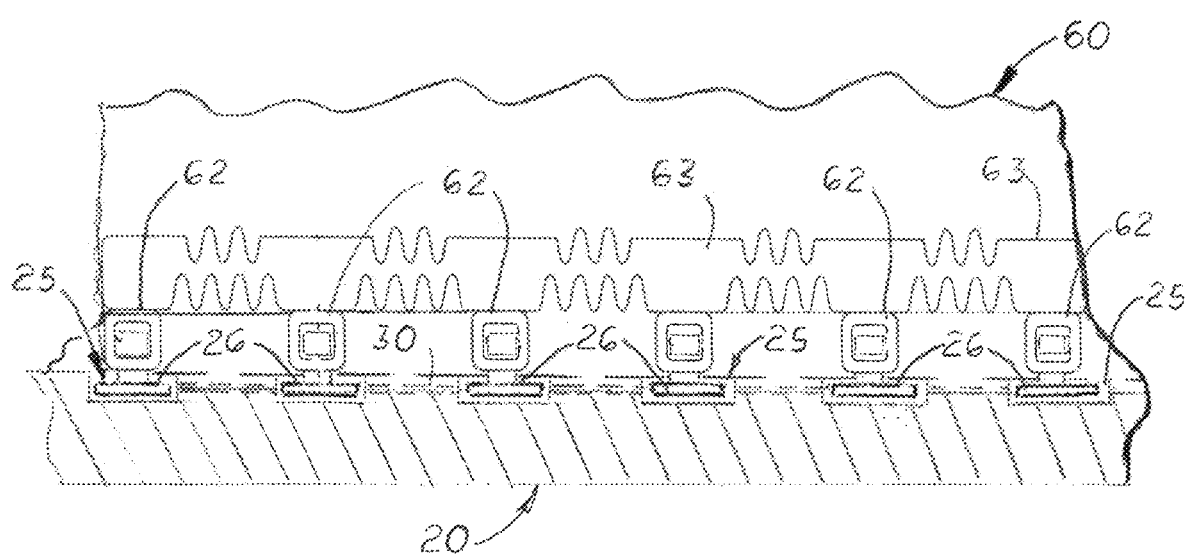
FIG. 15 is a partial, sectional side elevational view of a modular shoe showing the relative locations of the upper ribbon with hook members attached to the lower perimeter edge of the shoe upper connecting to clips attached to a lower ribbon mounted on the top surface of the outsole.

FIG. 15 is a partial, sectional side elevational view of a modular shoe showing the hook members 62 integrally formed on an upper ribbon 63 mounted on the inside surface of the shoe upper 60 just above the lower perimeter edge. Formed or mounted on the upper ribbon 63 with a plurality of hook members 62. The hook members 62 includes a closed loop configured to engage the tongue 29 on the clip 26 attached on the outsole 20.

During assembly, the mid-sole pad 40 is aligned and registered over the recessed surface 23 on the outsole 20 so that the clip openings 42 are aligned and registered over the clips 26 attached or formed on to the outsole 20. The mid-sole pad 40 may be adhesively attached to the top surface 23.

The upper sole pad 80 is configured to fit inside the shoe upper 60 and cover the mid-sole pad 40. In one embodiment, the upper sole pad 80 is made of elastic foam.

The outsole 20 is configured to be used with a wide variety of different styles of shoe uppers 60. As shown in FIG. 1, the shoe upper 60 includes a lower perimeter edge 61 with a plurality of hook members 62 configured to attached to some or all the clips 26 on the outsole 20. In the embodiment shown herein, the clips 26 on the outsoles 20 and the hook members 62 on the shoe uppers are at standardize locations. The number of hook members 62 on the shoe upper 60, however, may vary. If a particular shoe upper 60 requires fewer clips 26, any unused clips 26 on the outsole 20 are covered by a compatible mid-sole pad 40 or by a compatible upper shoe pad 80.

Each outsole 20 is configured to be used with a set of two or more shoe uppers 60, 60' all the same size and are compatible with the outsole 20 but are different styles and colors. The hook members 62 formed on the shoe uppers 60, 60' in the set are aligned in the same locations thereby enabling one outsole 20 to be used with different shoe uppers 60, 60' from the set. This not only allows the retailer and manufacturer to carry less inventory but also allows the retailer and manufacturer to offer different styles and colors of footwear 10 using the same components.

Figure 16:
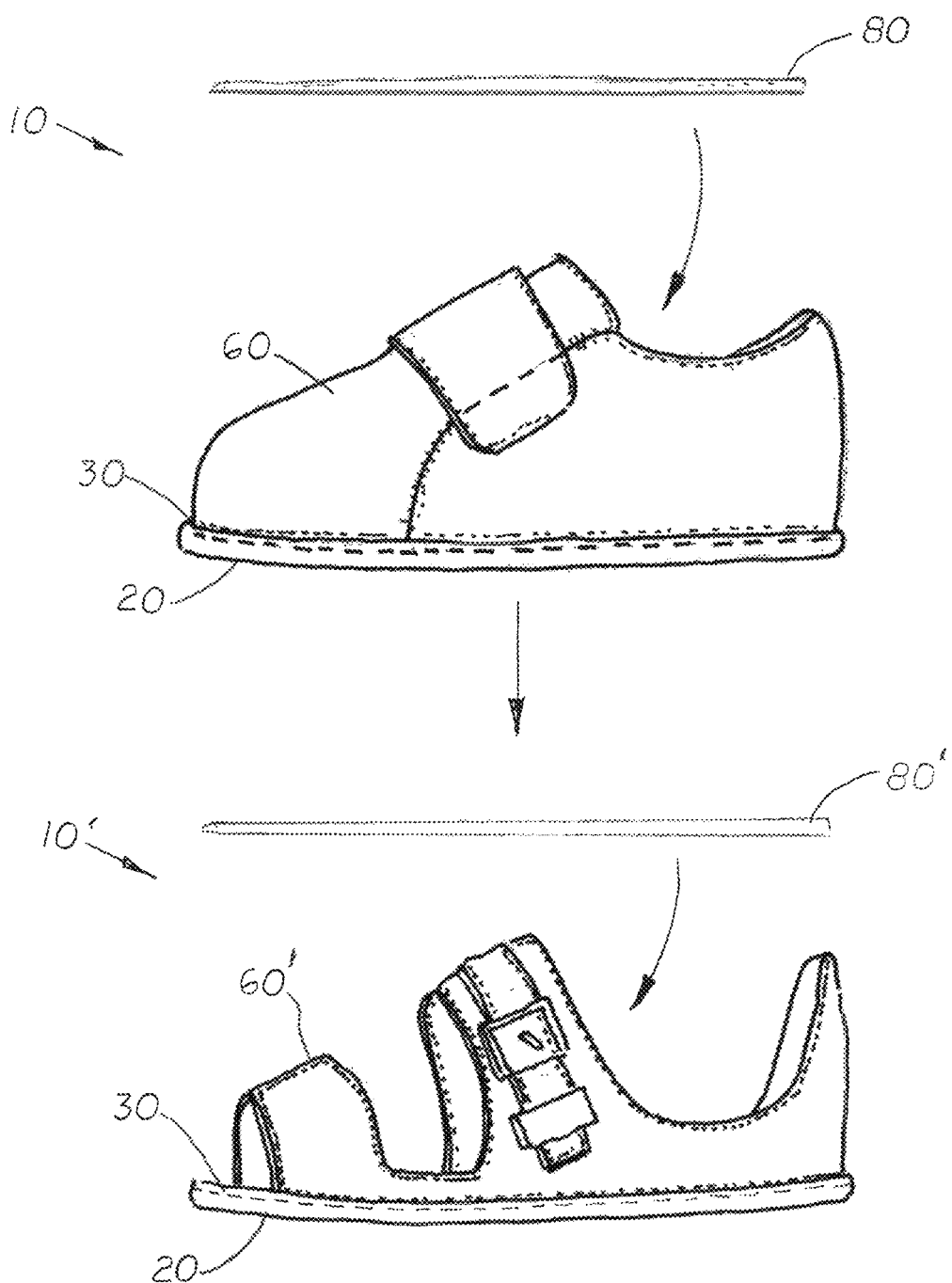
FIG. 16 is an illustration showing two styles of footwear both the same size that uses two different styles of shoe uppers and one outsole, one mid-sole pad.

FIG. 16 is an illustration showing two styles of footwear 10, 10' both the same size that uses two different styles of shoe uppers 60, 60' and the same outsole 20 and mid-sole pad 30. If necessary, the upper sole pad 80 may be replaced by a replacement upper sole pad 80'.

Figure 17:
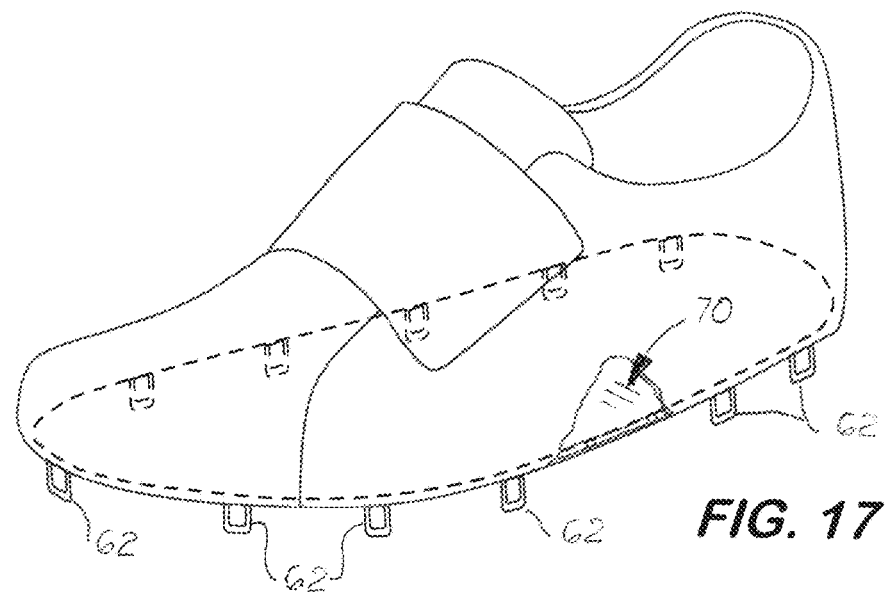
FIG. 17 is a perspective view of an embodiment of the shoe upper that includes a rubber-like midsole attached to the lower edges of the shoe upper.

In another embodiment, shown in FIGS. 17, a rubber-like midsole 70 may be attached to the lower edges 61 of the shoe upper 60 to create a water-resistant joint between the outsole 20 and the shoe upper 60. The rubber-like midsole 70 may be attached to the lower edges 61 of the shoe upper 60 by stitching or a suitable adhesive. With both methods, the hook members 62 are configured to extend below the rubber-like midsole 70 and connect to the clips 26 as discussed above.

In an alternative embodiment, the hook members 62 may be individually attached to the inside surface of the shoe upper 60 or they made integrally formed on a ribbon 63 and attached to the inside surface of the shoe upper 60 as shown inn FIG. 1. Alternatively, the hook members 62 may be individually attached to the bottom surface of the rubber-like midsole 70 or they may be integrally formed on a ribbon 63 that is attached to the bottom surface of the rubber-like midsole 70.

Figure 18:
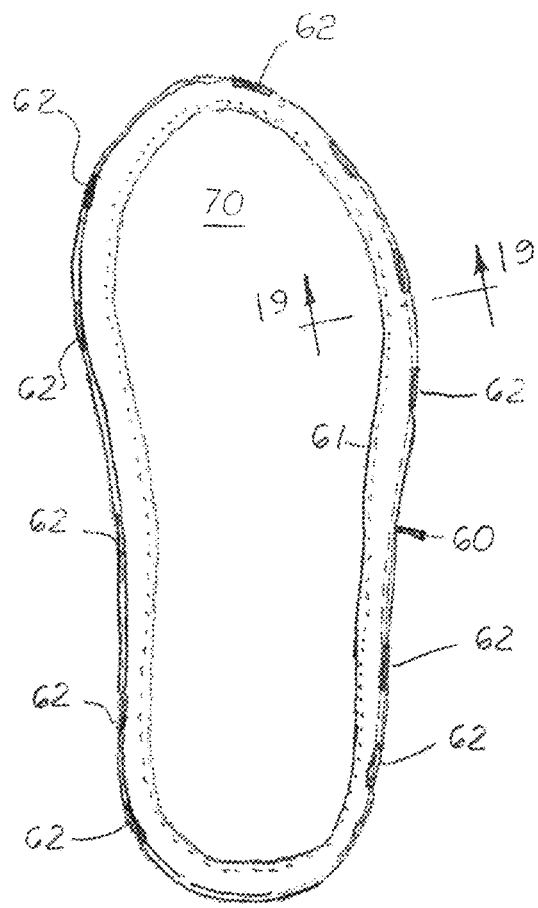
FIG. 18 is a bottom plan of the shoe upper shown in FIG. 17.

FIG. 18 is a bottom plan of the shoe upper shown in FIG. 17 showing the lower edge 61 of the shoe upper 60 being folded over and extended inward over the bottom surface of the rubber-like midsole 70. The lower edge 61 of the shoe upper 60 is sewn or adhesively attached to the bottom surface. Slits or holes are formed in the shoe upper 60 that allow the hook members 62 to extend through.

Figure 19:
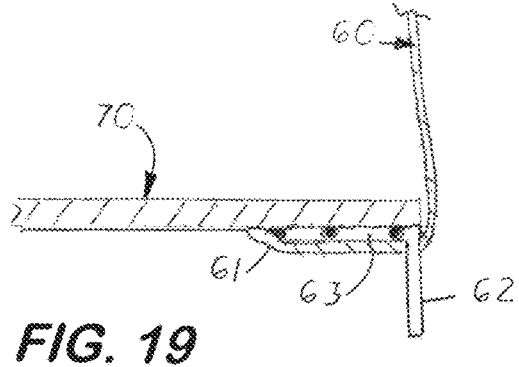
FIG. 19 is a sectional view taken along line 19-19 in FIG. 18.

FIG. 19 is a sectional view taken along line 19-19 in FIG. 18 showing more clearly the hook member 62 integrally formed on a ribbon 63 that is adhesively attached to the bottom surface of the rubber-like 70 and also showing the lower edge 61 of the shoe upper 60 being folded inward and over the ribbon 63.

FIG. 10 is a partial side elevational view of a shoe upper with a midsole and shown a hook member extending downward from the shoe upper.

Figure 21:
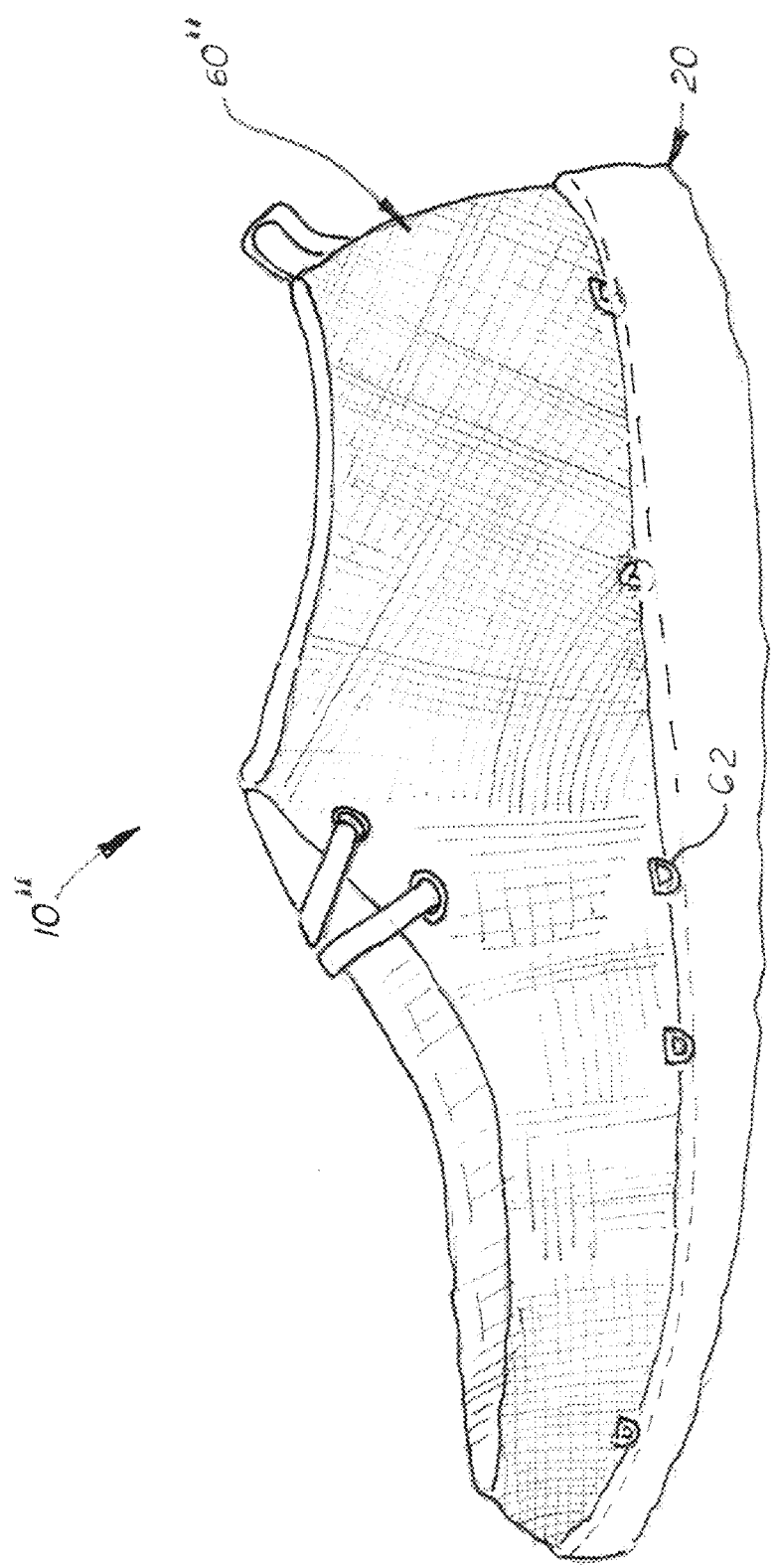
FIG. 21-24 are four drawings shown the different designs that can be printed on the knitted shoe upper shown in FIG. 20.
Figure 22:
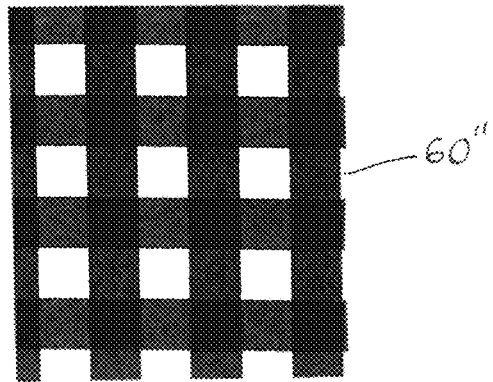
Figure 23:
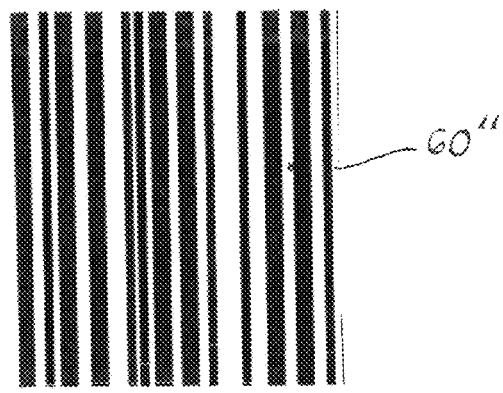
Figure 24:
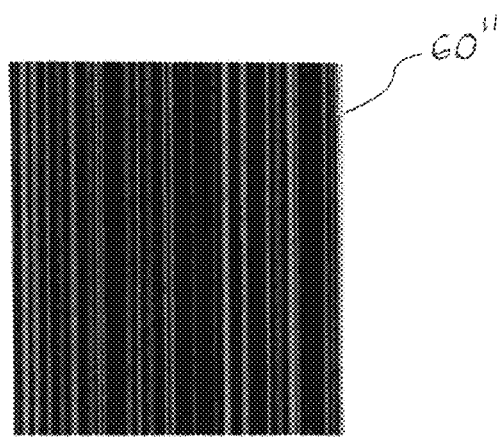

FIG. 21 is a side elevational view of a footwear with a knitted shoe upper with hooks knitted to the inside surface of the knitted shoe upper and being attached to the outsole.

Figure 20:
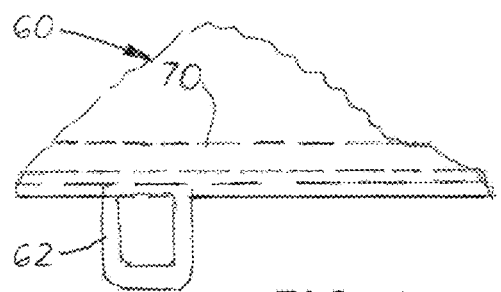
FIG. 20 is a side elevational view of a footwear with a knitted shoe upper with hooks used to attach the knitted shoe upper to the outsole.

FIG. 22-25 is four drawings shown the different designs that can be printed on the knitted shoe upper shown in FIG. 20.

Figure 25:
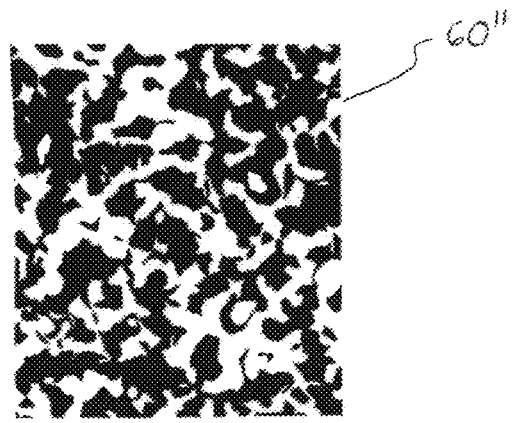
FIG. 25 is a side elevational view of a hook member extending downward from the rubber-like midsole.

Inside a footwear retail store, a footwear ordering and assembly system 100 is located shown in FIG. 25. The system 100 includes a server 110 with a shoe assembly software program 112 loaded into its working memory. The server 110 is linked to an outsole database 120, a mid-sole database 130, an upper shoe database 140, and an upper sole pad database 150. In one embodiment, a customer 160 uses an ordering device 170 to select a pair of footwear 99 either from a retail shoe catalogue, from a menu page 220 located on the display 172 on the ordering device 170 or from a website 220 that connects to the server 110 via a WAN 250. In one embodiment, in the preferred embodiment the ordering device 170 includes a display 172 enabling the customer to review the image footwear 99 prior to purchasing it. When a particular size and style of footwear 10 is selected, an order 300 is then sent to the server 110. The shoe selection software program 112 identifies the order 300 and determines the style and size of the footwear 10 and the style and size of the outsole 20, the mid-sole pad 40, the upper shoe 60, and upper sole pad 80 needed to make the pair of footwear 10. The selected outsole 20, mid-sole pad 40, shoe upper 60 and the upper sole pad 80 are then delivered to an assembly workbench.

Figure 26:
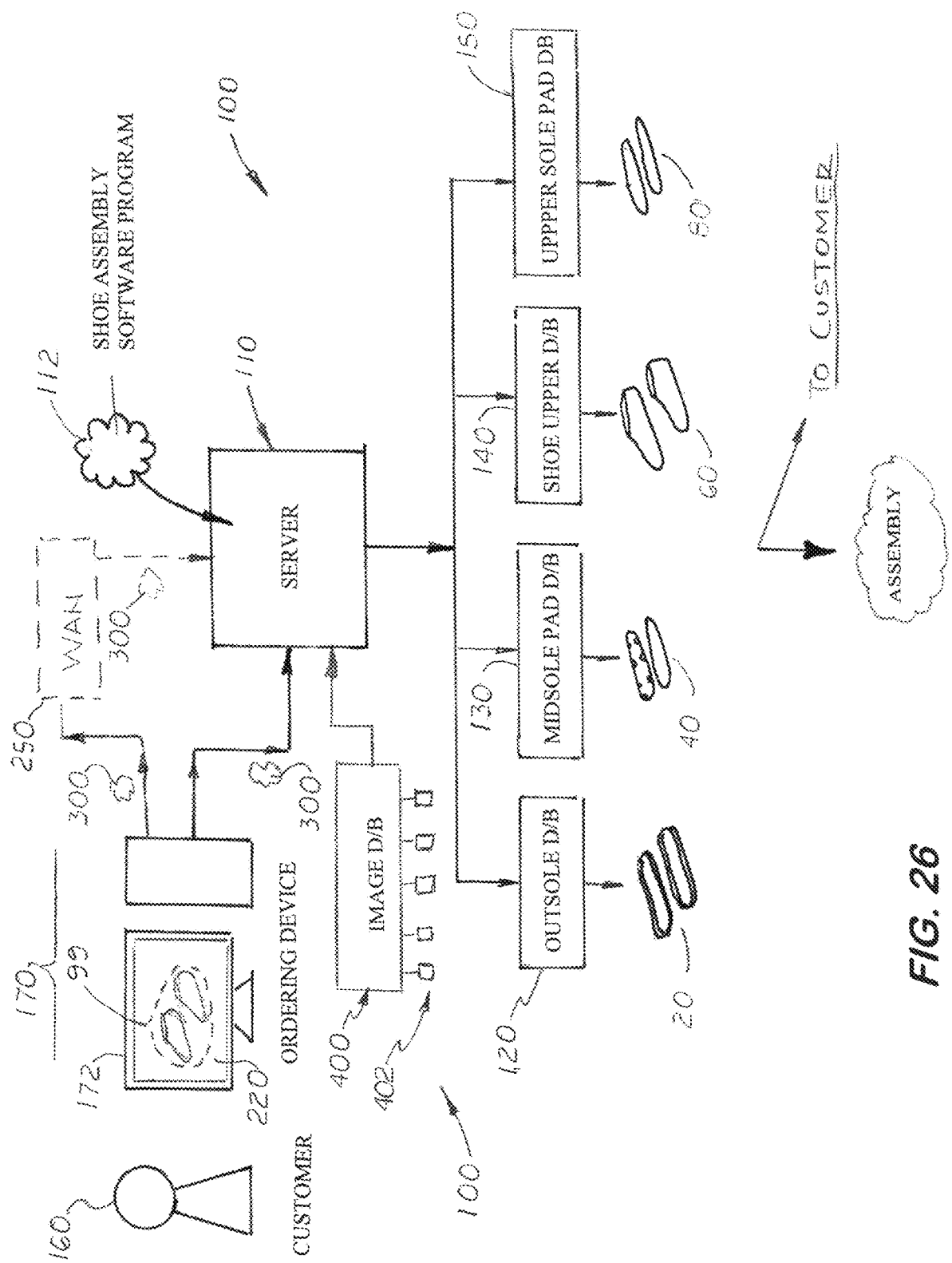
FIG. 26 is a diagram showing a customer using the retail store footwear ordering and assembly system selects the outsole, the midsole pad, the shoe upper, and the upper sole pad to assemble a pair of footwear.

As shown in FIG. 26, the system 100 includes a server 110 linked to an outsole database 120, a mid-sole pad database 130, a shoe upper database 140, and an upper sole database 150. When a particular size and style of footwear (indicated by reference number 99) is selected by a customer 160, the server 110 determines the particular outsole 20, mid-sole pad 40, shoe upper 60 and upper sole pad 80 from the databases 120, 130, 140, and 150, respectively.

Figure 27:
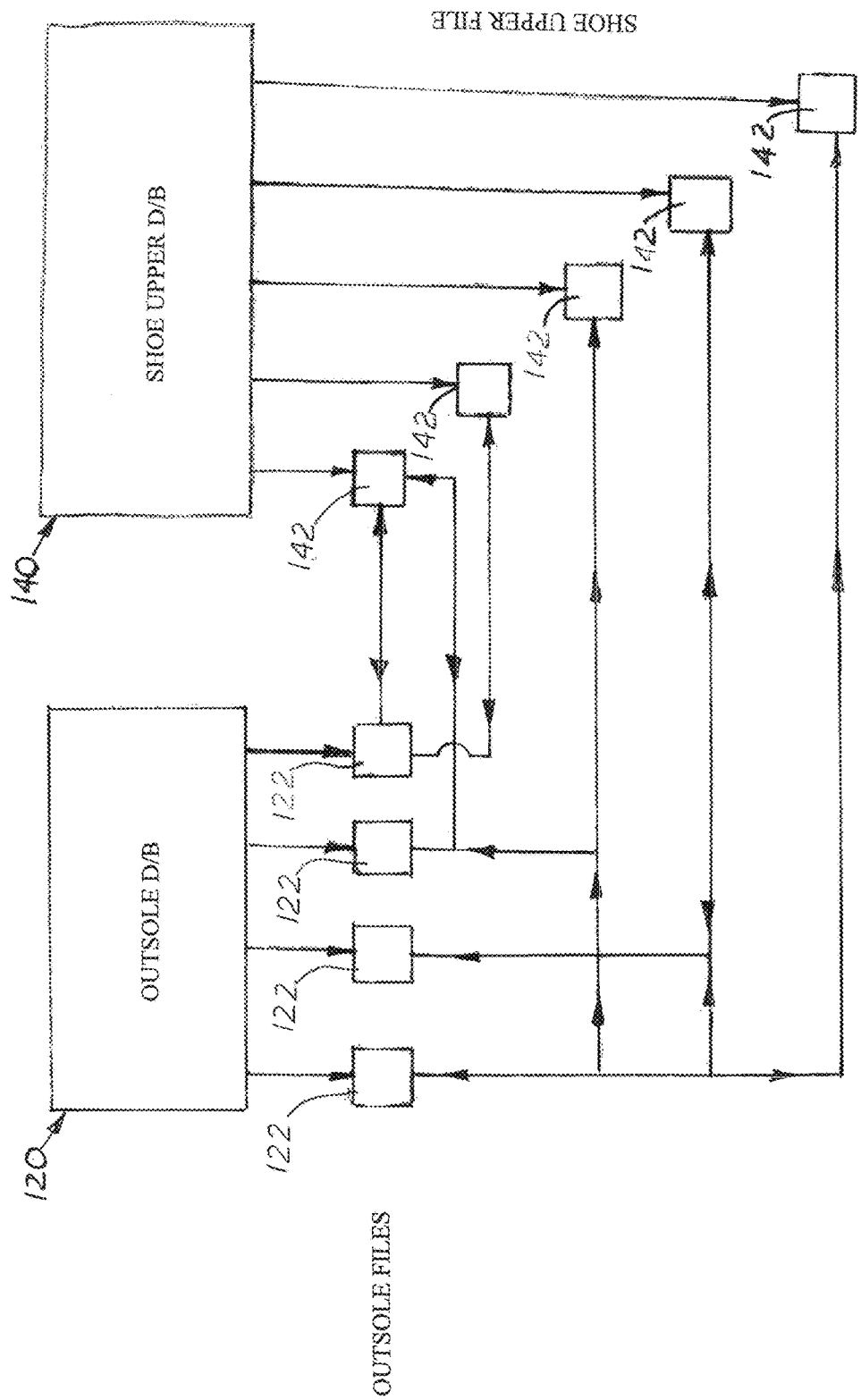
FIG. 27 is a diagram showing the outsole database containing a plurality of outsole file and showing the shoe upper database containing a plurality of shoe upper files each associated with at least one outsole file.
Figure 28:
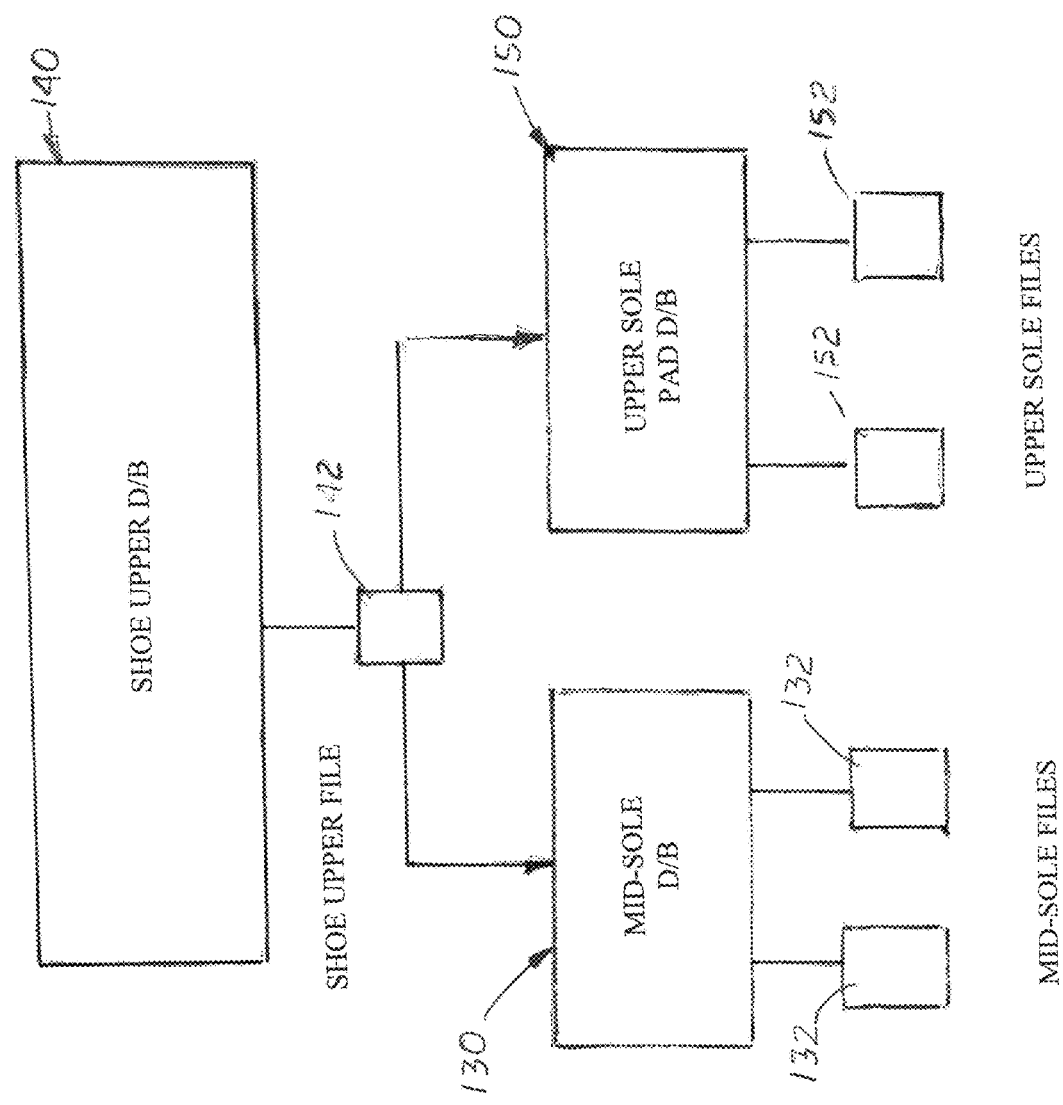
FIG. 28 is a diagram showing that each shoe upper file is associated with a mid-sole file from the mid-sole database and with an upper sole file from the upper sole database.

As shown in FIG. 27, the outsole database 120 includes a plurality of outsole files 122 each associated with a particular style and size of outsole 20. As shown in FIG. 27 is a shoe upper database 140 that includes a plurality of shoe upper files 142 each associated with a particular style and size of shoe upper 60. When a particular size and style of footwear 99 is selected as shown in FIG. 26, the outsole file 122 associated with the outsole 20 is identified. The type of shoe upper file 142 associated with the shoe supper 60 and used with the footwear is also. As shown in FIG. 28, each shoe upper file 142 in the shoe upper database 140 is associated with a mid-sole file 132 in the mid-sole database 130 and with an upper sole pad file 152 in the upper sole pad database 150.

Figure 29:
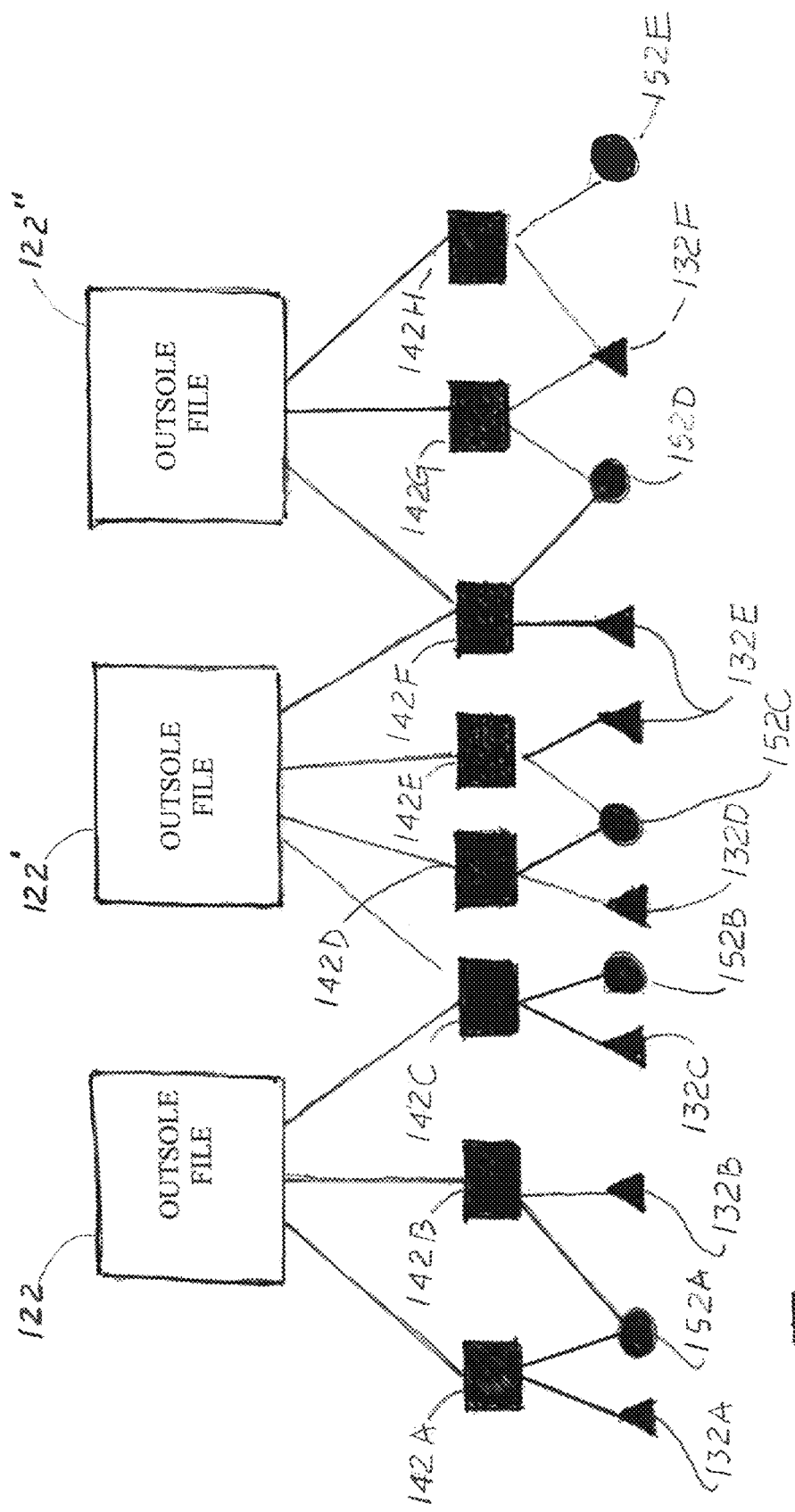
FIG. 29 is a diagram showing three outsole files associated with shoe upper files and showing the shoe upper files associated with mid-sole pad file and an upper sole file.

FIG. 29 is an illustration showing how three outsole files 122, 122' and 122" are associated with different combinations of shoe upper files, midsole files and upper sole pad files. Outsole file 122 may be used with three shoe upper files 142A, 142B, and 142B. Outsole file 122' may be used with three shoe upper files 142D, 142E, and 142F. Outsole file 122" may be used with shoe upper files 142F, 142G, and 142H. Shoe upper file 142A may be used with mid-sole pad file 132A and upper sole pad file 152A. Shoe upper file 142*b* may be used with mid-sole pad file 132*b* and upper sole pad file 152A. Shoe upper file 142C may be used with mid-sole pad file 132*c* and upper sole pad file 152B. Shoe upper file 142D may be used with mid-sole pad file 132D and upper sole pad file 152C. Shoe upper file 142E may be used with mid-sole pad file 132E and upper sole pad file 152C. Shoe upper file 142F may be used with mid-sole pad file 132E and upper sole pad file 152D. Shoe upper file 142G maybe used with mid-sole pad file 132F and upper sole pad file 152D. Shoe upper file 142H may be used with one mid-sole pad file 132F and upper sole pad file 152E.

By cross-referencing the outsole file 122 with the shoe upper files 142, the cross-referencing the shoe upper files 142 to the mid-sole files 132 and the upper sole pad files 142, the system 100 can determine which shoe upper files 142 are compatible with an outsole file 122 and which mid-sole pad and upper sole pads are needed to assembly the footwear. Thus, if a customer has purchased footwear 99 that uses an outsole associated with an outsole file 122 that can be used with other shoe uppers, the customer knows that substitute shoe uppers may be purchased and exchanged with the original shoe upper. Also, if the customer has purchased footwear 99 that uses a shoe upper associated with a shoe upper that can be used with other outsoles, the customer knows that substitute outsoles may be purchased and exchanged with the original outsole.

For example, if a customer purchases footwear in one season that includes an outsole 20, a mid-sole pad, 40 a shoe upper 60 and an upper sole pad 80 and later wants to change the style or color of footwear by modifying the shoe upper 60, the system 100 allows the customer to purchase a replacement shoe upper for use with the existing outsole. If the customer purchases a footwear using an outsole associated with outsole file 122, that may be used with one a shoe upper 142, the customer knows that different replacement shoe uppers are not available.

As shown in FIG. 26, the server 110 is coupled directly to an ordering device 170 located inside the footwear store or at a remote location via the WAN 250. Associated with each outsole file 122 or shoe upper file (not shown) an optional image file stored in an image database 400 connected to the server 110. The image database 400 includes image files that show all of the possible styles and sizes of footwear 99 that can be assembled. Using the system 100 described above, customers may view different images of footwear 99 that can be assembled using different combinations of outsoles and shoe uppers prior to purchase.

At the workbench, the mid-sole pads 30 are inserted into the outsoles 20. It should be understood that in some instances, the mid-sole pads 40 may be pre-attached or molded onto the outsoles 20. This typically is done when the outsole 20 is used with only one style of shoe upper or when the hook arrangements on different shoe uppers are identical.

Figure 30:
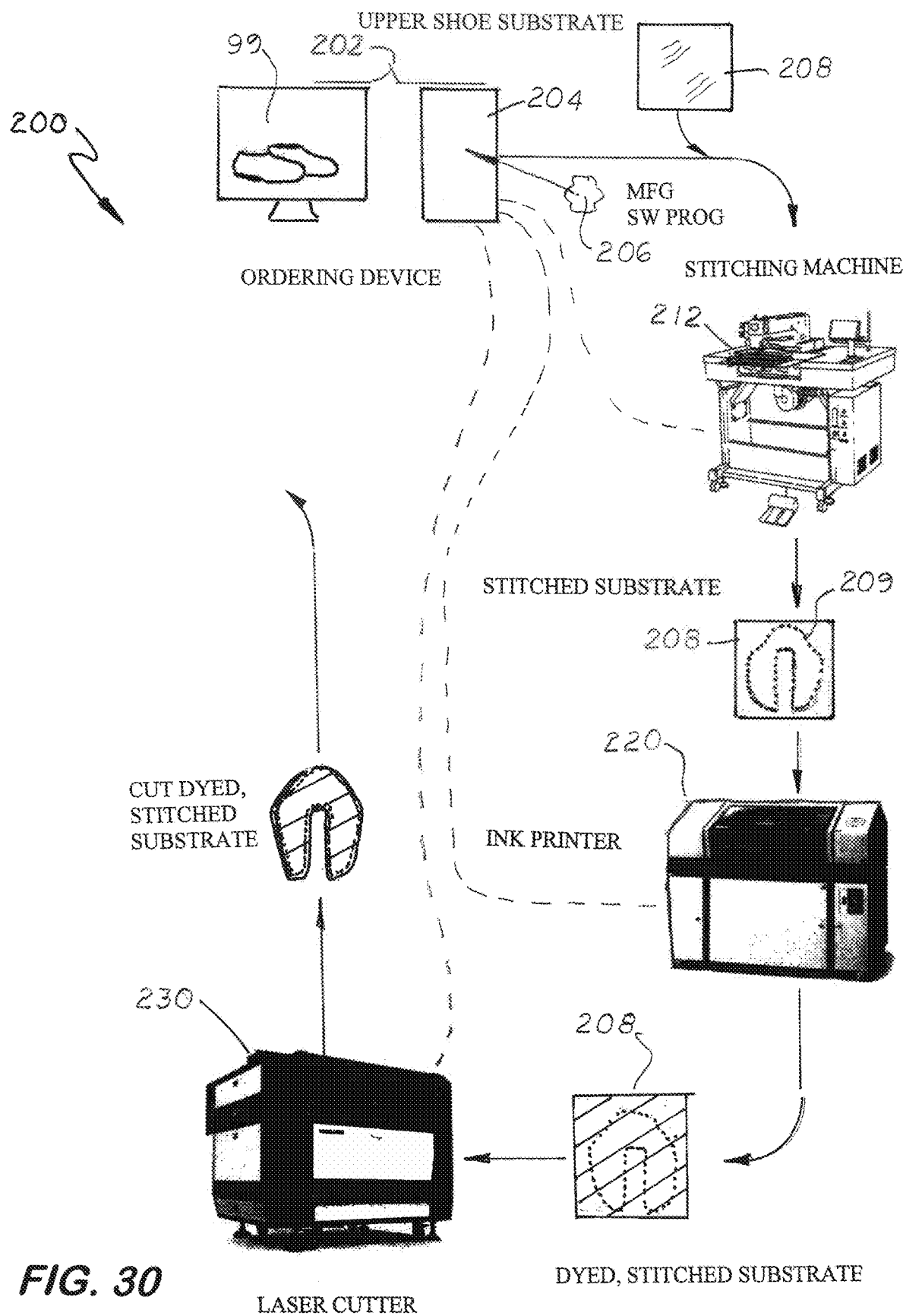
FIG. 30 is a diagram illustrating showing the equipment and steps used to manufacture the modular footwear.

As shown in FIG. 30, a shoe upper manufacturing system 200 is shown that may be installed in the retail store or in nearby assembly facility that allows the retailer to make the shoe uppers 60. The manufacturing system 200 includes an ordering device 202 used by the retailer that is coupled to a server 204. Loaded into the working memory of the server 204 is a manufacturing software program 206. Coupled to the server 204 is a stitching machine 212, an ink printer 220, and a laser cutting machine 230. When a customer selects a style and size of footwear 99, the manufacturing software program 404 identifies the style and size of the upper shoe used with the footwear 99. The manufacturing software program 206 then sends instructions to the stitching machine 212 instructing it to stitch the outline 209 of the upper shoe in a stock piece of leather 408. After the stitch line 209 has been created in the stock piece of leather, the stock piece of leather, now called a stitched substrate 208 is then delivered to an optional ink printer 220, also controlled by the manufacturing software program 206. The ink printer 220 then prints a graphic or picture selected or created by the consumer on the stitched substrate 208. After drying, the stitched substrate 208 is then delivered to a laser cutting machine 230 that cuts the stock piece of leather along the outside edge of the sticking line to form a cut, dyed stitched substrate that is then sent to the assembly station where the hook members are attached to the shoe upper. If a rubber-like midsole is desired, then the rubber-like midsole is attached to the lower opening of the shoe upper The stitching machine 212 used in the above described manufacturing system 400 is a CNC industrial sewing machine, such as Juki Ams 251, available from Juki Industrial Sewing Machine Company.

The ink printer 220 used in the above described manufacturing system is made for printing or leather is a UV flat bed Ink printer Roland LEF 300 available from Roland DGA Corporation.

The laser cutting machine 230 is a fabric cutting machine available from Bosslaser LS 1630.

The above shoe upper manufacturing system 200 may also be used with knitted shoe uppers 60" as shown in FIG. 20. When knitted shoe uppers 60" are used, the above stitching machine 212 and laser cutting machine 430 are not used. Instead, an inventory of premanufactured, stock knitted shoe uppers in different styles and sizes are purchased by the store owner. When an order for a pair of footwear 10" with knitted shoe uppers 60" is placed, the pre-manufactured knitted shoe uppers 60" are pulled from inventory. Each knitted shoe upper 60" includes a plurality of hook members 62 knitted into the inside surface of the knitted shoe upper 60". The knitted shoe uppers 60" have be dyed and sold in different colors to the footwear operator or they maybe sold in a standard base color, such as white, that can be dyed by footwear operator using the ink printer 220. The manufacturing software program includes a menu page that lists the different colors and designs (see FIGS. 22-25) that can be printed on the shoe upper 60".

In compliance with the statute, the invention described has been described in language more or less specific on structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

We claim:

1. A customized, individually fitted footwear, comprising:
    a. an outsole configured to fit a foot of an individual, said outsole includes a top surface and a bottom surface, formed on said top surface is a raised perimeter edge, formed on said top surface and adjacent to said perimeter edge is a plurality of clip openings;
    b. a plurality of clips, one said clip being adhesively attached inside one said clip opening;
    c. a shoe upper disposed over said outsole and configured to cover all or a portion of the upper surface of a user's foot when placed over said top surface of said outsole, said shoe upper includes a lower perimeter edge with an upper ribbon attached thereto, said upper ribbon includes a plurality of hook members extending downward beyond said lower perimeter edge, said hook members being aligned on said shoe upper so that each said hook member engages one said clip located on said outsole and thereby holding said shoe upper over said outsole; and
    d. an upper sole pad disposed over said outsole that covers said clip openings and said clips.

2. The footwear as recited in claim 1, wherein said clips are attached to a lower ribbon mounted on the top surface of the outsole.

3. The footwear as recited in claim 1, wherein each said clip include a lower base and an L-shaped, elevated upper tongue disposed over said lower base, said upper tongue forms a receiving cavity configured to receive one said hook member extending downward from said shoe upper.

4. The footwear as recited in claim 1, wherein said shoe upper is made of knitted material.

5. The footwear as recited in claim 4, wherein said upper ribbon or said hook members are knitted into said shoe upper.

6. The footwear as recited in claim 1, further including a mid sole disposed over said outsole.

7. The footwear as recited in claim 1, wherein said outsole is made of composite material and said clips are molded into said outsole.

8. A customized, individually fitted footwear, comprising:
    a. an outsole configured to fit a foot of an individual, said outsole includes a top surface and a bottom surface, formed on said top surface is a raised perimeter edge, formed on said top surface and adjacent to said perimeter edge is a plurality of clip openings;
    b. a plurality of clips, one said clip being attached to said top surface of said outsole, and includes a lower base and an L-shaped, elevated upper tongue disposed over said lower base, said upper tongue extending above said lower base thereby forming a receiving cavity configured to receive a hook member extending downward from said shoe upper;
    c. a shoe upper disposed over said outsole and configured to cover all or a portion of the upper surface of a user's foot when placed over said top surface of said outsole said shoe upper includes a lower perimeter edge with an upper ribbon attached thereto said upper ribbon includes a plurality of hook members extending downward beyond said lower perimeter edge, said hook members being aligned on said shoe upper so that each said hook member engages one said clip located on said outsole and thereby holding said shoe upper over said outsole; and
    d. a sole pad disposed over said outsole that covers said clips and said clip openings.

9. The footwear as recited in claim 8, wherein said shoe upper is made of knitted material.

10. The footwear as recited in claim 9, wherein said hook members are knitted into the shoe upper.

11. The footwear as recited in claim 8, further including a mid-sole disposed over said outsole.

12. The footwear as recited in claim 11, wherein the shoe upper is made of knitted material.

13. The footwear as recited in claim 12, wherein said hook members are knitted into said shoe upper.

* * * * *